Dec. 22, 1936.  R. B. LAWRENCE  2,065,318
COOKING DEVICE
Filed Sept. 3, 1935
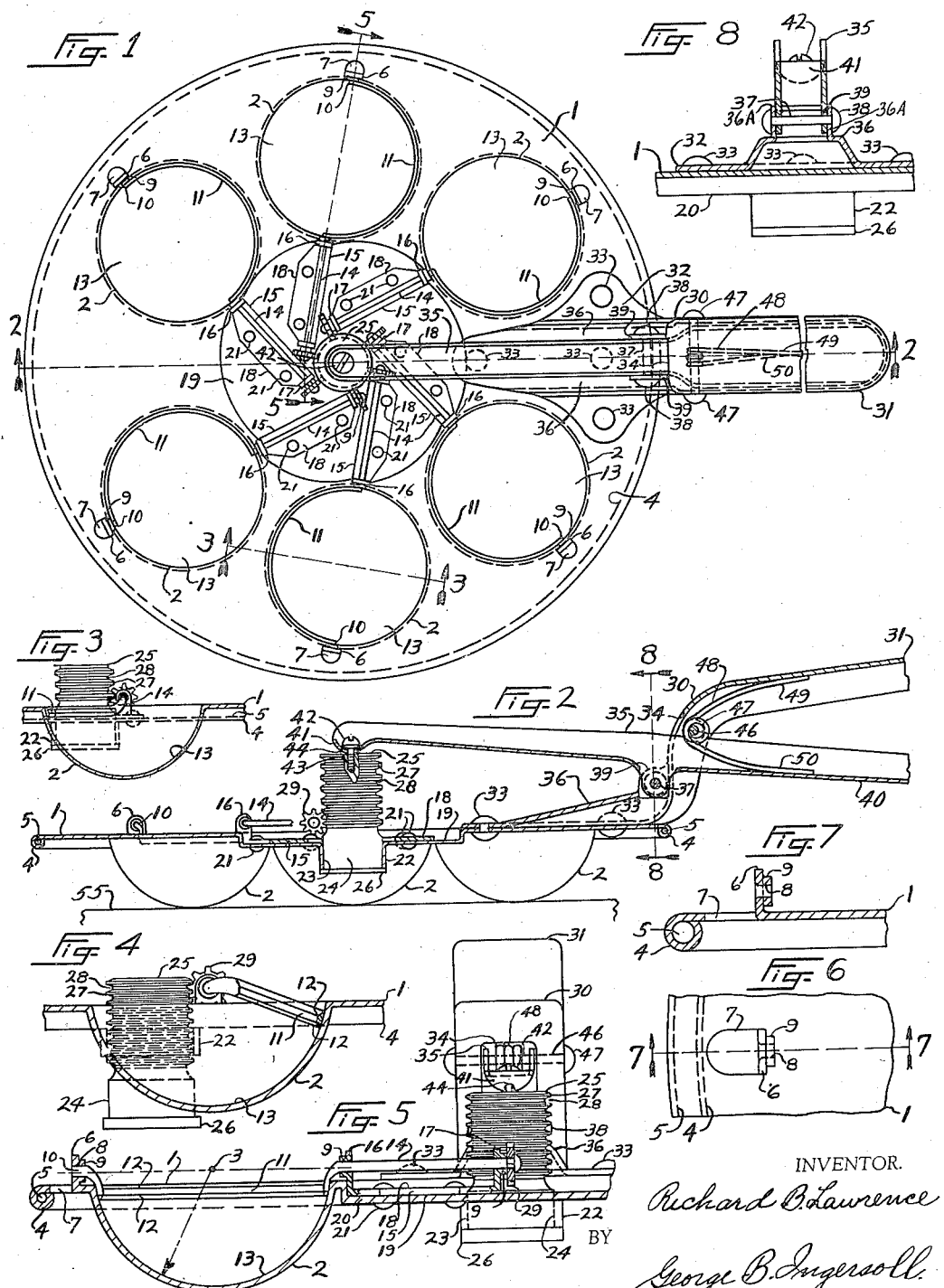
INVENTOR.
Richard B Lawrence
BY
George B. Ingersoll.
ATTORNEY.

Patented Dec. 22, 1936

2,065,318

UNITED STATES PATENT OFFICE 2,065,318

COOKING DEVICE

Richard B. Lawrence, Detroit, Mich.

Application September 3, 1935, Serial No. 38,911

16 Claims. (Cl. 53—6)

My invention relates to improvements in a cooking device having means for ejecting cooked materials from the cooking device, and the objects of my improvements are, first, to provide a cooking device provided with a plurality of bowl, cup or compartment portions for containing the units of material to be cooked; second, to provide a cooking device having means for cooking a plurality of units together with means for ejecting the plurality of units simultaneously from the cooking device; third, to provide a cooking device adapted for cooking a plurality of units at one time and having a minimum number of parts therein, thus providing for maximum economy in manufacture of such a device; fourth, to provide a cooking device having a plurality of cooking compartments or container portions arranged radially around a mechanism for operatively ejecting the cooked units from the compartments; fifth, to provide a cooking device having a plurality of container compartments together with operative means for ejecting cooked material from the plurality of compartments by means of a handle operated mechanism; sixth, to provide a cooking device having a plurality of cooking compartments each having ejecting means provided with a gear member together with a sole plunger member for operating all of the gear members thereof; seventh, to provide a cooking device having a plurality of compartments forming feet portions for supporting the cooking device; eighth, to provide a cooking device having an operating lever utilized as one of a pair of handle members; and ninth, to provide a plunger member having a plurality of parallel grooves extending circumferentially therearound and adapted to engage and operate gear members.

I attain these objects by the mechanism illustrated in the accompanying drawing, in which—

Figure 1 is a plan view of the cooking device; Fig. 2, a sectional view of the cooking device taken on the line 2—2, Fig. 1; Fig. 3, a partial section of the cooking device taken on the line 3—3, Fig. 1, disclosing a scraper or ejecting member together with a plunger member for actuating same, both at the beginning of their strokes or movements; Fig. 4, a partial sectional view of the cooking device taken substantially on the line 3—3, Fig. 4 and disclosing the scraper or ejection member together with the plunger member for actuating same, both substantially at the ends of their strokes or movements, Fig. 4 being drawn to a slightly larger scale than Fig. 3; Fig. 5, a partial sectional view of the cooking device taken on the line 5—5, Fig. 1; Fig. 6, a partial plan view of the lug or boss portion of the main plate or housing member for providing a bearing for one end of the scraper or ejection member, said view being drawn to a larger scale than Fig. 1; and Fig. 7, a sectional view of the portion of the cooking device disclosed in Fig. 6, said sectional view being taken on the lines 7—7, Fig. 6; and Fig. 8, a sectional view of the cooking device taken on the line 8—8, Fig. 1.

Similar numerals refer to similar parts throughout the several views.

The plate or housing 1 is preferably circular in shape although it may be made of any desired shape and is constructed from a relatively thin sheet of metal such as steel, aluminum or similar metal, and may be provided with a chrome, baked enamel, or similar finish to enhance its appearance, said housing 1 being provided with a plurality of depressions, compartments, cups, or container portions 2 which are semi-spherical in shape and have their centers located substantially above the upper surface of the housing 1 as indicated at 3, at the end of the radial line in Fig. 5.

The compartments or containers 2 will be formed as integral parts of the housing 1 and will be preferably located radially around the center of the housing 1.

The housing 1 will be provided with a cylindrical or rolled edge or bead portion 4 extending around its periphery and at the lower side thereof, the edge or bead 4 being preferably formed with the hollow or tubular chamber 5 extending longitudinally thereof and around the housing 1.

The housing 1 will be provided with a plurality of flange or lug portions 6 located adjacent the outer side of the compartments 2 and also adjacent the periphery of the housing 1, said lug portions 6 being formed by piercing the openings 7 in the main or horizontal portion of the housing 1, the openings 7 being substantially of semi-circular shape at their outer sides to allow the lug portions 6 to be pressed or formed to extend substantially at right angles to the upper surface of the housing 1, the lug portions 6 thus having a semi-cylindrical shape at their outer or upper ends to enhance their appearance, said lug portions 6 being integrally connected at their lower ends to the horizontal portion of the housing 1.

The lug portions 6 are also each provided with the punched hole 8 by forming or extruding the portion 9 to extend from and to be integrally connected therewith at the inner side of the lug portion 6, the punched holes 8 extending entirely through the lug portions 6 and the portions 9 to form cylindrical bearing surfaces for the end or journal portions 10 of the scraper or ejector members 11 which are provided with the inclined or angular cutting or scraping surfaces 12 at each of their sides for engaging and scraping the inner surfaces 13 of the compartments 2.

The scraper or ejector members 11 are each provided with the shaft or shank portion 14 which is cylindrical in shape and is substantially of the same diameter as the cylindrical end 10, said cylindrical end 10 and the shaft 14 having their axes located and extended to pass through the point 3 as indicated in Fig. 5.

The brackets 15 are each provided with lug portions 16 and 17 at each of their ends, the lug portions 16 and 17 being bent upwardly to extend substantially at right angles to the flange portion 18 and each being provided with the extruded portions 9 in a similar way to the lug portions 6 of the housing 1 to form, with the punched holes extending therethrough, a bearing for the shaft 14 of the scraper or ejector member 11.

The flanges 18 will be extended at one side of each of the brackets 15 and will be secured to the surface 19 of the depressed portion 20 by the rivets 21, the depressed portion 20 being formed or pressed with substantially cylindrical shape to extend below the main horizontal surface of the housing 1, the depressed surface 20 being of sufficient size to extend adjacent the inner sides of the compartments 2, the depressed portion 20 thus substantially increasing the structural strength and rigidity of the housing 1. The depressed portion 20 is also extruded at its central portion to provide the boss portion 22 extending downwardly from its under side, the boss portion 22 being provided with the punched hole or bore 23, which provides a bearing for the journal portion 24 at the lower end of the plunger or shaft member 25, the shaft member 25 being provided with the collar or shoulder portion 26 at its lower end and which is adapted to engage the lower edge or end surface of the boss portion 22 of the housing 1 to limit the upward travel or movement of the plunger or shaft member 25. The plunger or shaft member 25 is provided with a plurality of teeth or collar portions or members 27 which are formed by turning the grooves 28 therebetween, the grooves 28 and the teeth 27 being provided with no pitch but extending circumferentially around the plunger 25 in parallel planes, the teeth 27 being formed with a contour similar to conventional gear teeth, thus adapting them to engage each of the gear members 29 which are secured to the inner ends of the shaft portions 14 of the scraper members 11 by forming the inner ends of the shaft portion 14 with suitable flattened or square portions over which the gear members 29 are placed and further secured as by riveting at the outer ends of the shaft portions 14, the gear members 29 thus being located at the inner side of the lug portions 17 of the brackets 15.

It will be readily noted that the scraper members 11 are thus adapted to be rotated in their bearings when the gear members 29 are revolved by the engagement of the teeth 27 of the plunger 25 when the plunger 25 is actuated or operated by means which will now be disclosed.

The handle member 30 is formed with a handle portion 31 which is bent upwardly to extend above the main or horizontal surface of the housing 1, the handle member 30 being formed with the flange portion 32 which engages and extends adjacent the main or upper horizontal surface of the housing 1 and is secured thereto by the rivets 33, the handle member 30 being provided with the opening 34 extending therethrough and through which extends the lever member 35.

In order to provide a support for the lever member 35, the handle member 30 is provided with the wall portions 36 having the flanges or lugs 36A through which extends the pin or shaft 37 which is riveted or upset at its ends 38 to retain the pin 37 longitudinally.

The lever member 35 is provided with the boss portions 39 which are provided with suitable openings for engaging and forming a bearing on the pin 37 so that the lever member 35 may be pivotally supported and operated on the pin 37. The handle member 35 is provided with the handle portion 40 which extends through the opening 34 of the handle 30 at the underside of the handle portion 31 of the handle 30. The lever member 35 is provided with the depressed portion 41 at its inner end, said depressed portion preferably having a semi-spherical shape to engage the semi-spherical surface at the lower portion of the head 42 of the screw 43 which extends through the clearance opening 44 of the depressed portion 41 and threadably engages a threaded hole in the upper end of the plunger 25, thus securing the lever member 35 to the plunger 25 and yet allowing pivotal motion of the lever member 35 relative to the screw 43 and the plunger 25.

The lever member 35 and the handle member 30 are formed or pressed from sheet metal to each provide U-shaped portions having their open sides facing one another in the handle portions 31 and 40.

The pin or shaft 46 extends through the side walls of the U-shaped portion of the handle member 30 and is retained longitudinally by the upset or riveted ends 47. The resilient or spring member 48 is secured to the pin or shaft member 46 as by coiling therearound and is provided with the end portion 49 extending within and contacting the inner surface of the U-shaped portion of the handle portion 31 of the handle member 30, the spring 48 being further provided with the end 50 which extends within and engages the inner surface of the U-shaped portion of the handle portion 40 of the lever member 35, thus tending to resiliently urge the handle portion 40 of the lever member 35 away from the handle portion 31 of the handle member 30 and to move the inner end of the lever member 35 together with the depressed portion 41 and the screw 42 upwardly to maintain the plunger 25 in its uppermost portion in which the collar or shoulder portion 36 engages the lower end or edge surfaces of the boss portion 22 of the housing 1, thus tending to always maintain each of the scrapers 11 in a position disclosed at the upper or left hand side of the compartment 2, as viewed in Fig. 3, and substantially adjacent the upper edge of each of the surfaces 13.

It is to be noted that the extreme bottom surfaces of the compartments 2 will be located in a common plane and this will permit the cooking device to be supported by the bottom portions of the compartments 2 on a table or similar supporting surface, as indicated at 55, Fig. 2.

It will now be readily noted that I have invented a cooking device that is adapted to bake a plurality of muffins, biscuits, etc., and is also further adapted to cook and retain therein eggs, either in a poaching or boiling operation, in the various compartments thereof and for many other similar cooking operations.

Also my cooking device may be utilized for forming jelly molds in which a preparation is placed in the compartments thereof in a fluid or semi-fluid state and allowed to harden or congeal.

In operation the pastries are mixed and poured into the compartments 2, or in the case of jelly these are prepared in their fluid or semi-fluid state and placed therein, the scraper members 11 always being maintained substantially in the position as disclosed in Figs. 1 and 3 due to the spring 47, urging the handle portions 31 and 40 apart, thus maintaining the plunger member 25, together with the scraper members 11, in their initial positions as disclosed in Figs. 1 and 3.

After the cooking device has been removed from its position in which the cooking operation is performed or after the jelly molds have congealed, the operator grasps the handle portions 31 and 40 and by compressing and moving the handle portion 40 toward the handle member 31, thus compressing the ends 49 and 50 of the spring 48, the spring 48 causing the lever member 35 to pivotally move about the pin member 37 and the plunger 25 to move in and through the bore 23 of the boss portion 22 of the depressed portion 41, the lever member 35 forcing or moving the plunger 25 downwardly in the bore or hole 23, the teeth 27 of the plunger member 25 engaging the teeth of the gear members 29 and causing the scraper members 11 to rotate or revolve so that the scraper portion thereof is located, as disclosed in Fig. 4, and relative to which position the collar or shoulder portion 26 of the plunger 25 is located in a position removed from the lower edge surface of the boss portion 22, the total downward movement of the plunger 25 being dictated by the amount of space between the handle portions 31 and 40 which thus is adapted to control or limit the closing movements thereof.

With the operation of the scraper members 11 from the positions as disclosed in Figs. 1 and 3 to the positions as disclosed and indicated in Fig. 4, it will be readily noted that the baked or similar unit, such as muffins, biscuits, jelly molds, or similar matter, which have filled the compartments 2 will have been scraped, cut or severed from their connection with the surfaces 13 of the compartments 2 and by inverting or turning over the cooking device the various units will immediately drop and be ejected therefrom, this operation readily enabling the cooking or congealed units to be disposed in an upside down position upon a platter or similar member for serving in any desired manner.

As soon as the baked or congealed units have been ejected upon the platter or similar member from the compartments 2, the spring 48 will exert, through their end portions 49 and 50, a spreading movement to cause the handle member 40 of the lever member 35 to immediately move away from the handle portion 31 of the handle member 30, thus causing the plunger member 25 to be raised or moved to its upper or initial position which will further cause the scraper members 11 to return from their positions as shown in Fig. 4 to their initial positions as disclosed in Figs. 1 and 3.

I claim:

1. In a cooking device, the combination of a plate member having a plurality of cup portions together with a depressed portion at its central portion, said depressed portion being provided with a boss portion extending therebelow, said plate member being further provided with a plurality of upturned flanges, a plurality of bracket members secured to the depressed portion of said plate member and each having a pair of upturned flanged portions, scraper members revolvably mounted in said upturned flanges of said plate member and said flanged portions of said bracket members, each of said scraper members having a scraping edge adjacent the surface of one of said cup portions, gear members fixedly secured on said scraper members, a plunger member slidably mounted in the boss of said plate member and provided with teeth portions extending substantially around said plunger members in parallel planes, said teeth portions of said plunger member engaging said gear members, a handle member secured to said plate member, said handle member being further provided with an opening therethrough, a lever member pivotally mounted on said handle member and extending through the opening thereof, said lever member being provided with a semi-spherical portion at its inner end together with an opening through said semi-spherical portion, a screw member extending through the opening of said semi-spherical portion of said lever member and engaging said plunger member, said screw member having a semi-spherical surface for engaging a surface of said semi-spherical surface of said lever member, and a resilient member mounted between said handle and said lever members for urging said lever member away from said handle member.

2. In a cooking device, the combination of a plate member having a depressed portion at its central portion, said depressed portion being provided with a boss portion having a bore therethrough, said plate member being further provided with a plurality of semi-spherical depressed portions arranged around said first mentioned depressed portion, scraper members rotatably mounted and each having cutting edges adjacent the surface of one of said semi-spherical depressed portions, gear members fixedly secured to said scraper members, a plunger member slidably mounted in said bore of said first mentioned depressed portion of said housing, said plunger member being provided with teeth portions engaging said gear members, a handle member secured to said plate member, a lever member pivotally mounted and operatively connected with said plunger member, and resilient means mounted between said handle and said lever members and tending to urge said handle and said lever members apart.

3. In a cooking device, the combination of a plate member provided with a plurality of semi-spherical cups, scraper members rotatably mounted and engaging surfaces of said semi-spherical cups, gear means operatively connected with said scraper members, a handle member secured to said plate member, a lever member pivotally mounted and provided with a handle portion, and resilient means mounted between said handle member and said handle portion of said lever member.

4. In a cooking device, the combination of a plate member provided with compartments, scraper members rotatably mounted and engaging surfaces of said compartments, a gear member on each of said scraper members, a plunger provided with teeth engaging said gear members, and means for actuating said plunger.

5. In a cooking device, the combination of a plurality of cups, a plurality of scraper members rotatably mounted and engaging said cups, gear members on each of said scraper members, a sole plunger member having teeth engaging said gear members, and means for actuating said sole plunger member.

6. In a cooking device, the combination of a plate member provided with a bead around its periphery together with a depressed portion at its central portion, said plate member being provided with a plurality of cups arranged around said depressed portion, scraper members revolvably mounted and extending within said cups, gear members on said scraper members, a plunger slidably mounted in said depressed portion and engaging said gears, and means for actuating said plunger member.

7. In a cooking device, the combination of a plate member provided with a plurality of cups, a scraper mechanism engaging each of said cups, a gear member mounted adjacent the inner sides of said cups and operating said scraper mechanisms, said gear member engaging all of said scraper mechanisms, and means for operating said gear means.

8. In a cooking device, the combination of a plate member provided with cup portions together with flanged portions adjacent said cup portions, a plurality of bracket members, scraper members revolvably supported in said flanged portions of said plate member and in said bracket members, said scraper member engaging said cup portions, gear means for operating said scraper members, and means for operating said gear means.

9. In a cooking device, the combination of a plate member provided with cup portions, scraper members revolvably mounted on said plate member and engaging said cup portions, gear members on said scraper members, a member movably mounted in said plate member and provided with teeth portions extending circumferentially around said member in parallel planes, said teeth portions engaging all of said gear members, and means for moving said last mentioned member.

10. In a cooking device, the combination of a plate member having a plurality of boss portions each provided with a bore, said plate member being provided with cup portions, a plurality of bracket members each having a pair of end portions formed to extend substantially at right angles to said plate member, each of said end portions having an extruded portion forming a second boss portion having a bore in alignment with one of the bores of said boss portions of said plate member, scraper members revolvably mounted in the bores of said boss portions of said plate members and in said end portions of said bracket members, said scraper member engaging said cup portions of said plate member, and means for revolving said scraper members, and resilient means for actuating said first mentioned means to an initial position.

11. In a cooking device, the combination of a plate member provided with a plurality of cups, scraper members revolvably mounted and each provided with a cutting edge adjacent a surface of one of said cups, gear members on said scraper members, a plunger provided with teeth engaging said gear members, a handle secured to said plate member, a lever member pivotally mounted on said handle member, means connecting said lever member and said plunger member, and resilient means between said handle and said lever members.

12. In a cooking device, the combination of a plate member provided with a plurality of cups, scraper members revolvably mounted and each provided with a cutting edge adjacent a surface of one of said cups, gear members on said scraper members, a plunger provided with teeth engaging said gear members, a handle secured to said plate member, a lever member pivotally mounted on said handle member, said lever member being provided with a semi-spherical portion having an opening therethrough, a screw extending through said opening of said lever member and engaging said plunger, said screw having a semi-spherical surface engaging a surface of said semi-spherical portion of said lever member, and resilient means between said handle and said lever members.

13. In a cooking device, the combination of a plate member provided with cups, scraper members revolvably supported by said plate member and each provided with a cutting edge adjacent a surface of one of said cups, gear mechanism for operating said scraper members, a handle member secured to said plate member and provided with boss portions, a lever member operatively connected with said gear mechanism and provided with a boss portion, a shaft extending through said boss portions of said lever and said handle members, and a resilient means mounted between said handle and said lever members.

14. In a cooking device, the combination of a plate member provided with cups, scraper members revolvably supported by said plate member and each provided with a cutting edge adjacent a surface of one of said cups, gear mechanism for operating said scraper members, a handle member secured to said plate member and provided with boss portions, said handle member being provided with an opening therethrough, a lever member operatively connected with said gear mechanism and provided with a boss portion, said lever member extending through said opening of said handle member, a shaft extending through said boss portions of said lever and said handle members, and a resilient means mounted between said handle and said lever members.

15. In a cooking device, the combination of a plate member provided with cups, scraper members revolvably supported on said plate member and each having a scraping edge adjacent a surface of one of said cups, gear mechanism for revolving said scraper members, a handle member secured to said plate member and provided with an U shaped hand grip portion, a lever pivotally mounted on said handle portion and operatively connected with said gear mechanism, said lever having a hand grip portion formed with an U shape and having the open side of said U shape facing the open side of said U shaped hand grip portion of said handle member, a pin mounted in said handle member, and a resilient member mounted on said pin and having end portions extending within and engaging the inner surfaces of said U shaped portions of said handle and said lever members.

16. In a cooking device, the combination of a plate member provided with a plurality of cups, scraper members revolvably mounted on said plate member and each having a scraping edge adjacent a surface of one of said cups, gear means for revolving said scraper members, a handle member secured to said plate member and having a portion bent upwardly above and outwardly from the periphery of said plate member to form a hand grip portion, said handle member being provided with an opening through its upwardly bent portion, a lever member pivotally mounted on said handle member and having a hand grip portion extending below the hand grip portion of said handle member, said lever member being operatively connected with said gear means, and resilient means mounted between the hand grip portions of said handle and said lever members.

RICHARD B. LAWRENCE.